United States Patent Office 2,841,560
Patented July 1, 1958

2,841,560
PRESSURE TRANSMITTING FLUIDS

George E. Barker, New Castle, Del., assignor to Atlas Powder Company, Wilmington, Del., a corporation of Delaware No Drawing. Application December 2, 1954
Serial No. 472,773

6 Claims. (Cl. 252—78)

This invention relates to pressure transmitting fluids and more particularly to pressure transmitting fluids of low flammability.

This application is a continuation-in-part of application Serial No. 407,109, filed January 29, 1954, now U. S. Patent 2,767,145.

It is the object of the invention to provide pressure transmitting fluids which are essentially non-flammable and which may be utilized over a wide range of temperatures and particularly at low temperatures.

The pressure transmitting fluids of the invention may conveniently be thought of as comprising a base liquid or solvent containing dissolved additives for specific purposes and they will be so described in this specification. The said base liquid is a ternary composition of ethylene glycol, water and formamide containing from 6% to 40% water, from 20% to 75% ethylene glycol and from 4% to 55% formamide, to a total of 100%, all percentages being by weight. Preferred base liquids within the broad range so defined are those containing from 20% to 35% water, at least 10% formamide and at least 30% ethylene glycol.

To provide properties of fluidity desirable where extremes of temperature are encountered, the pressure transmitting fluids of the invention contain viscosity index improvers. Suitable viscosity index improvers are high molecular weight compounds of elongated molecular structure which are soluble in the base liquid above-defined. Among such may be named the higher polyethylene glycols, particularly those ranging upwards from 3,000 in molecular weight; soluble gums such as gum arabic or gum tragacanth; cellulose derivatives, particularly sodium carboxy methyl cellulose; linear polymeric acids, particularly polyacrylic acid; and polyglycol esters of high molecular weight carboxylic acids. Preferred viscosity index improvers in composition of the invention are polyoxyethylene ether-esters of dimerized higher unsaturated fatty acids. Such ether-esters may be conveniently prepared by the direct addition, at elevated temperature and pressure, of ethylene oxide to the dimerized acids. Particularly preferred are the condensation products of from 20 to 35 mols of ethylene oxide with one mol of linoleic acid dimer.

The content of viscosity index improver in pressure transmitting fluids in accordance with the invention may vary over a considerable range depending upon the choice of improver, the composition of the base liquid, and the use to which the fluid is to be put. Thus, a fraction of a percent of medium viscosity carboxymethyl cellulose (sodium salt) is as effective with respect to increasing the viscosity as is several percent of polyethylene glycol having an average molecular weight of 6,000. Satisfactory fluids will be obtained, in general, if sufficient viscosity improver is added to the base liquid to adjust its viscosity to between about 2 and about 150 centistokes at 130° F.

In addition to the base liquid and viscosity index improver hereinbefore described, the pressure transmitting fluids of the invention may contain optional ingredients added for specific purposes. Among such may be named corrosion inhibitors, boundary lubricants and cloud point inhibitors.

Among the known corrosion inhibitors are organic amines such as morpholine or the ethyl ethanolamines, inorganic nitrites, organic nitrites, sodium benzoate, ethyl benzoate or ethyl paramino benzoate. Particularly effective as an inhibitor against corrosion of copper and copper containing alloys is sodium mercaptobenzothiazole. The above and other corrosion inhibitors may be employed singly or in combination, and in the proportions necessary to protect the particular hydraulic system in which the fluid is employed. Suitable concentrations range from 0.1% by weight up to 3%.

Boundary lubricant additives are particularly desirable to reduce pump-wear in hydraulic systems where hydraulic fluids are circulated at high velocities. Petroleum sulfonates are particularly suitable for this purpose and may conveniently be employed in concentrations of from 1% to 3%.

The components of base liquids of the pressure transmitting fluids produced in accordance with the invention are compatible over wide temperature ranges but frequently the compounded fluids show a tendency to become cloudy and show phase separation at elevated temperatures when the viscosity index improver contains polyoxyalkylene radicals. Accordingly, it is expedient to include in fluids containing such improvers, especially if they are to be employed at elevated temperatures, up to 5% by weight of an additive to prevent clouding and phase separation. Salts of alkyl aryl sulfonic acids and particularly amine salts of such acids have been found very effective as retarders and inhibitors of cloud formation at elevated temperatures. Also effective are the amine salts of acid sulfates of lower polyglycol ethers of highly branched aliphatic alcohols. Particularly to be named in this connection are the sodium and isopropyl amine salts of dodecyl benzene sulfonic acid, and the isopropyl amine salt of sulfated triethylene glycol monoether of a highly branched tridecyl alcohol.

Specific examples of pressure transmitting fluids for use under conditions of sub-zero temperatures and prepared in accordance with the invention are presented in Table I. The superiority of the preferred polyoxyethylene ether-esters of linoleic acid dimers as viscosity index improvers is evident from inspection of the tabulated data. Employing compound B at the 15% level, fluids with viscosities as high as 36 centistokes at 130° F. can be obtained which are satisfactorily fluid at —65° F. (viscosity=1,000 to 1,500 centistokes). By employing less of the same or related compounds (at levels of 7.5 to 10%) viscosities of 400 to 1,000 centistokes at the very low temperature of —65° F. can be obtained in compositions exhibiting viscosities of 4 to 10 centistokes at 130° F.

Table I

| Example No. | Composition of Base Liquid | | | Composition of Fluid | | | Freezing Point, °F. | Viscosities (Centistokes) | |
|---|---|---|---|---|---|---|---|---|---|
| | Ethylene Glycol, Percent | Formamide, Percent | Water, Percent | Base Liquid, Percent | Viscosity Improver | | | at 130° F. | at −65° F. |
| | | | | | Compound | Percent | | | |
| 1 | 48 | 32 | 20 | 90 | A | 10 | −83 | 3.9 | 663 |
| 2 | 42 | 24 | 34 | 90 | B | 10 | −83 | 6.9 | 529 |
| 3 | 57.5 | 12.5 | 30 | 92.5 | B | 7.5 | below −100 | 9.0 | 1,036 |
| 4 | 56 | 36 | 8 | 90 | B | 10 | −82 | 6.9 | 1,817 |
| 5 | 30 | 40 | 30 | 90 | C | 10 | −90 | 2.8 | 408 |
| 6 | 30 | 40 | 30 | 90 | D | 10 | −105 | 2.8 | 912 |
| 7 | 30 | 40 | 30 | 90 | E | 10 | −90 | 1.8 | 388 |
| 8 | 30 | 40 | 30 | 90 | B | 10 | | 7.3 | 453 |
| 9 | 40 | 40 | 20 | 90 | B | 10 | | 6.4 | 946 |
| 10 | 50 | 30 | 20 | 99.5 | F | 0.5 | below −105 | 4.2 | 1,665 |
| 11 | 50 | 30 | 20 | 90 | G | 10 | | 5.4 | 2,040 |
| 12 | 50 | 30 | 20 | 99 | H | 1.0 | | 10.1 | 1,809 |
| 13 | 48 | 20 | 32 | 85 | B | 15 | | 35.8 | 1,355 |
| 14 | 42 | 23 | 35 | 85 | B | 15 | | 36.0 | 1,034 |

The viscosity improving compounds are coded as follows:
A = Polyoxyethylene ether-ester of linoleic acid dimer (Emery 955 Dimer Acids) containing 28 oxyethylene groups.
B = Polyoxyethylene ether-ester of linoleic acid dimer (Emery 955 Dimer Acids) containing 24 oxyethylene groups.
C = Polyoxyethylene ether-ester of tall oil acids containing 16 oxyethylene groups.
D = Mixed polyoxyethylene-polyoxypropylene ether-ester of tall oil acids.
E = Heteric polyethylene-polypropylene glycol (UCON H660).
F = Sodium salt of carboxymethyl cellulose.
G = Polyethylene glycol of mol. wt. 6000.
H = Polyacrylic acid.

For the operation of hydraulic machinery indoors where the extremely low temperatures mentioned in the foregoing paragraphs and in Table I are not encountered fluids of higher viscosity at elevated temperature may be desirable. Typical examples of such fluids are the following:

EXAMPLE 15

| | Percent |
|---|---|
| Ethylene glycol | 34.2 |
| Formamide | 18.7 |
| Water | 20.9 |
| Viscosity improver A | 20.0 |
| Sod. dodecyl benzene sulfonate (33⅓% aq. solution) | 6.0 |
| Sod. mercaptobenzothiazole | 0.2 |

This solution after equilibriation for 5 days had a cloud point of more than 210° F. and a viscosity at 130° F. of 40 centistokes.

EXAMPLE 16

Substitution of viscosity improver B (see Table I) for viscosity improver A in the formula of Example 15 produced a fluid with a cloud point of 195° F. and a viscosity at 130° F. of 109 centistokes.

When employing the preferred polyoxyethylene ether-esters of linoleic acid dimer as viscosity-index improver, it is found that viscosities increase as the ratio of glycol to formamide in the base liquid increases. In Table II there are presented the viscosities at three temperatures of a series of compositions of constant water content and constant viscosity improver content wherein the proportions of glycol and formamide vary over a considerable range. The viscosity improver is the polyoxyethylene ether-ester containing 24 oxyethylene groups per mol of a dimerized unsaturated acid available from Emery Industries under the designation Empol 1022.

Table II

| Example No. | 17 | 18 | 19 | 20 |
|---|---|---|---|---|
| Base Liquid Composition: | | | | |
| Percent glycol | 59⅓ | 54 | 44 | 26 |
| Percent formamide | 16⅔ | 22 | 32 | 50 |
| Percent water | 24 | 24 | 24 | 24 |
| Fluid Composition: | | | | |
| Percent base liquid | 90 | 90 | 90 | 90 |
| Percent viscosity improver | 10 | 10 | 10 | 10 |
| Viscosities-Centistokes: | | | | |
| at 130° F | 37.5 | 32.9 | 25.4 | 13.7 |
| at −40° F | 358 | 288 | 185 | 82.5 |
| at −65° F | 1,437 | 953 | 705 | 307 |

Further, to illustrate the effect of salts of dodecyl benzene sulfonic acid on the high temperature stabilization of fluids in accordance with the invention, the following examples are presented. A hydraulic fluid without cloud point inhibitor consisting of 9% of the polyoxyethylene ether-ester (containing 24 oxyethylene groups per mol) of linoleic acid dimer in 91% of a base liquid comprising 41% ethylene glycol, 27.5% formamide and 31.5% water was found to become cloudy and separate into phases at temperatures above 130° F. The several inhibitors in the proportions, indicated in Table III, were added and the cloud points determined.

Table III

INHIBITION OF HIGH-TEMPERATURE CLOUDING

| Example No. | Inhibitor | Cloud Point, °F. |
|---|---|---|
| 21 | 2% isopropyl amine dodecyl benzene sulfonate | 200 |
| 22 | 2% hexylamine dodecyl benzene sulfonate | 180 |
| 23 | 4% hexylamine dodecyl benzene sulfonate | >210 |
| 24 | 2% methyl glucamine dodecyl benzene sulfonate | 140 |

The foregoing examples are illustrative only and are not presented by way of limting the scope of the invention. Those skilled in the art will recognize that many variations on the specific formulas recited can be prepared to produce hydraulic fluids adapted to a wide range of particular uses.

What is claimed is:

1. A pressure transmitting fluid comprising a base liquid consisting of at least 25% ethylene glycol, at least 10% formamide and from 20 to 35% water, all percentages being by weight, and a polyoxyethylene ether-ester of a dimerized higher unsaturated fatty acid, said ether-ester being soluble in said base liquid and present in sufficient quantity to adjust the viscosity of the fluid at 130° F. to between about 2 and about 150 centistokes.

2. A pressure transmitting fluid as in claim 1 wherein there is present up to 5% by weight of a cloud point inhibitor selected from the group consisting of salts of alkyl aryl sulfonic acids and amine salts of acid sulfates of lower polyglycol ether of highly branched aliphatic alcohols.

3. A pressure transmitting fluid as in claim 2 wherein the cloud point inhibitor is an alkyl aryl sulfonate.

4. A pressure transmitting fluid as in claim 2 wherein the cloud point inhibitor is sodium dodecyl benzene sulfonate.

5. A pressure transmitting fluid comprising a base liquid consisting of at least 20% ethylene glycol, at least 10% formamide and from 20 to 35% water, all percentages being by weight, and sufficient of a polyoxyethylene ether-ester of dimerized linoleic acid containing from 20 to 35 oxyethylene groups per mol to adjust the viscosity of the fluid at 130° F. to between about 2 and about 150 centistokes.

6. A pressure transmitting fluid comprising a base liquid consisting of at least 30% ethylene glycol, at least 10% formamide and from 20 to 35% water, all percentages being by weight, and from 7.5 to 15% by weight based on the total fluid of a polyoxyethylene ether-ester of dimerized linoleic acid.

References Cited in the file of this patent

UNITED STATES PATENTS

| | | |
|---|---|---|
| 1,687,094 | Isermann | Oct. 9, 1928 |
| 2,205,183 | Woodhouse | June 18, 1940 |
| 2,308,246 | Polin et al. | Jan. 12, 1943 |
| 2,588,970 | Esposito | Mar. 11, 1952 |
| 2,755,251 | Barker | July 17, 1956 |

FOREIGN PATENTS

| | | |
|---|---|---|
| 340,294 | Great Britain | Dec. 29, 1930 |